US007892038B1

(12) United States Patent
Kataoka et al.

(10) Patent No.: US 7,892,038 B1
(45) Date of Patent: Feb. 22, 2011

(54) CONNECTOR HAVING A CONNECTING MEMBER FOR CONNECTING THE TERMINALS OF TWO MATING CONNECTORS STACKED TOGETHER WITH AN ISOLATION MEMBER IN-BETWEEN

(75) Inventors: Yuta Kataoka, Hitachi (JP); Hideaki Takehara, Hitachi (JP); Kunihiro Fukuda, Tsukuba (JP); Sachio Suzuki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/774,865

(22) Filed: May 6, 2010

(30) Foreign Application Priority Data

Nov. 30, 2009 (JP) .............................. 2009-272315

(51) Int. Cl.
*H01R 24/00* (2006.01)
(52) U.S. Cl. ..................................... 439/660
(58) Field of Classification Search ................. 439/660, 439/353, 541.5, 492, 74
See application file for complete search history.

(56) References Cited

U.S. PATENT DOCUMENTS

| 5,967,850 | A * | 10/1999 | Crane, Jr. ................... 439/660 |
| 6,716,067 | B2 * | 4/2004 | Murata ........................ 439/660 |
| 7,189,120 | B2 * | 3/2007 | Zaderej ....................... 439/660 |
| 7,258,565 | B2 * | 8/2007 | Huang et al. ................. 439/353 |
| 7,267,573 | B2 * | 9/2007 | Sato et al. .................... 439/492 |
| 7,367,816 | B2 * | 5/2008 | Liu .............................. 439/74 |
| 7,731,526 | B2 * | 6/2010 | Sato ......................... 439/541.5 |
| 2008/0176453 | A1 * | 7/2008 | Minich et al. ............... 439/660 |
| 2009/0075506 | A1 | 3/2009 | Suzuki |

FOREIGN PATENT DOCUMENTS

| JP | 2004-056924 | 2/2004 |
| JP | 4037199 | 11/2007 |
| JP | 2009-070754 | 4/2009 |

\* cited by examiner

*Primary Examiner*—Chandrika Prasad
(74) *Attorney, Agent, or Firm*—Scully, Scott, Murphy & Presser, P.C.

(57) ABSTRACT

A connector has a first connector portion having a first housing with first connecting terminals aligned and accommodated therein, and a second connector portion having a second housing with second connecting terminals aligned and accommodated therein. When the first connector portion and the second connector portion are mated with each other, one side of the first connecting terminals and one side of the second connecting terminals faces each other to form pairs, respectively, so that a stacked structure of the pairs of the first connecting terminals and the second connecting terminals are alternately interleaved. Isolating members are aligned and accommodated in the first housing of the first connector portion and fixed to other side of the first connecting terminals, respectively. A connecting member presses the adjacent isolating member to collectively fix the first connecting terminals and the second connecting terminals at the contacts therebetween.

18 Claims, 4 Drawing Sheets

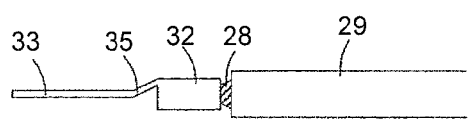
FIG.8A
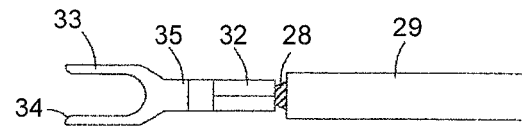
FIG.8B
FIG.9
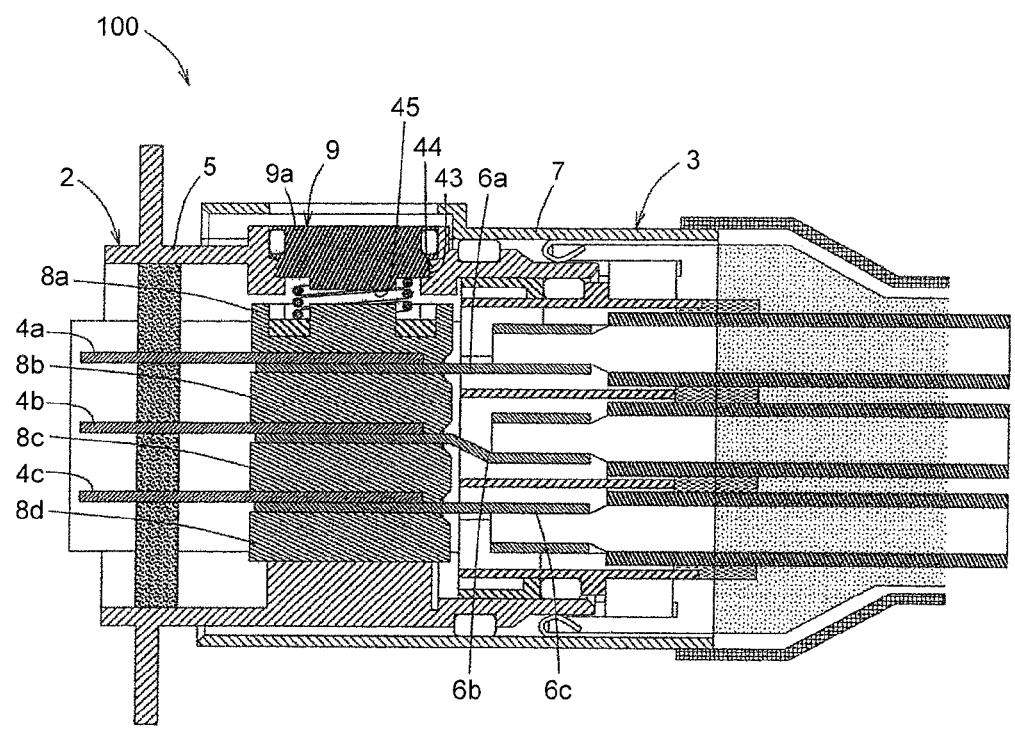

CONNECTOR HAVING A CONNECTING MEMBER FOR CONNECTING THE TERMINALS OF TWO MATING CONNECTORS STACKED TOGETHER WITH AN ISOLATION MEMBER IN-BETWEEN

The present application is based on Japanese patent application No. 2009-272315 filed on Nov. 30, 2009, the entire contents of which are incorporated herein by reference.

BACKGROUND OF THE INVENTION

1. Field of the Invention

The present invention relates to a connector, for use in eco-friendly cars, such as hybrid vehicles, electric vehicles and the like, and in particular, for being capable of use for a portion to connect a power harness, which is used for large power transmission.

2. Description of the Related Art

In hybrid vehicles, electric vehicles and the like which have remarkably developed in recent years, a power harness, which is used for large power transmission for connection between devices, e.g. between a motor and an inverter or between the inverter and a battery, has at its one end a connector, which consists of two separate portions: a male connector portion with a male terminal and a first terminal housing accommodating that male terminal, and a female connector portion with a female terminal connected with the male terminal and a second terminal housing accommodating that female terminal. For example, Japanese Patent Laid-Open No. 2009-070754 (JP-A 2009-070754) discloses a connector having the aforementioned structure.

In recent years, such eco-friendly cars have been designed to reduce the weights of all parts thereof, to enhance the energy saving performance of the cars. As one effective means to reduce the weights of parts of the cars, it has been proposed to reduce the sizes of the parts.

For example, a technique as described below, which is disclosed by JP Patent No. 4037199, has been known in the art.

JP Patent No. 4037199 discloses an electrical connection structure for a vehicle, which is for connecting multiphase connecting terminals of a conductive member drawn out from a motor for driving the vehicle, and multiphase connecting terminals of a power line cable drawn out from an inverter for driving the motor, in which each phase connecting terminal of the conductive member and each corresponding phase connecting terminal of the power line cable are overlapped, and isolating members are disposed on opposite surfaces to overlapped surfaces of the connecting terminals, respectively, and these overlapped connecting terminals and isolating members are collectively fastened in an overlapping direction with a single bolt provided in a position to penetrate these overlapped connecting terminals and isolating members.

That is, in the technique used in the electrical connector disclosed by JP Patent No. 4037199, the single bolt is tightened in the overlapping direction, to collectively hold the multiplicity of contacts between the connecting terminals, which are the overlapped surfaces of the connecting terminals, and thereby fix the connecting terminals at the contacts therebetween, for electrical connections between the connecting terminals, respectively. This configuration disclosed by JP Patent No. 4037199 is effective in easily ensuring size reduction, compared to a technique disclosed by JP-A-2009-070754.

Further, the technique of Japanese Patent No. 4037199 has the structure in which an interval between respective isolating members can be maintained by holding the isolating members sandwiching the contacts between the connecting terminals by a separately-provided holding jig. Such a structure is effective in easiness of inserting and removing of the connecting terminals.

However, since further downsizing is expected in late years, there is a following disadvantage. Namely, since the holding jig for keeping the interval between the respective isolating members is provided as an extra member, as disclosed by Japanese Patent No. 4037199, such a jig may be a factor of obstruct the downsizing.

SUMMARY OF THE INVENTION

Accordingly, the object of the present invention is to provide a connector with a stacked structure, in which a plurality of first connecting terminals, a plurality of second connecting terminals and a plurality of isolating members are alternately interleaved, for realizing further downsizing compared with a conventional device, without reducing the easiness of inserting and removing (insertability/removability) of the connecting terminal even though the holding jig is not additionally provided so as to keep the interval between the isolating members.

According to a feature of the invention, a connector comprises:

a first connector portion comprising a first housing with a plurality of first connecting terminals aligned and accommodated therein;

a second connector portion comprising a second housing with a plurality of second connecting terminals aligned and accommodated therein, when the first connector portion and the second connector portion being mated with each other, one side of the first connecting terminals and one side of the second connecting terminals facing each other to form pairs, respectively, and resulting in a stacked structure of the pairs of the first connecting terminals and the second connecting terminals alternately interleaved;

a plurality of isolating members aligned and accommodated in the first housing of the first connector portion, further fixed to other side of the first connecting terminals, respectively; and a connecting member comprising a head and a shaft connected to the head, the shaft penetrating each contact between the first connecting terminals and the second connecting terminals as well as the isolating members, the head pressing the adjacent isolating member, to thereby collectively fix the first connecting terminals and the second connecting terminals at the contacts therebetween, for electrical connections between the first connecting terminals and the second connecting terminals, respectively, at least a portion of the connecting member, which penetrates each contact, being formed of an insulating material.

According to another feature of the invention, a connector comprises:

a first connector portion comprising a first housing with a plurality of first connecting terminals aligned and accommodated therein;

a second connector portion comprising a second housing with a plurality of second connecting terminals aligned and accommodated therein, when the first connector portion and the second connector portion being mated with each other, one side of the first connecting terminals and one side of the second connecting terminals facing each other to form pairs, respectively, and resulting in a stacked structure of the pairs of the first connecting terminals and the second connecting terminals alternately interleaved;

a plurality of isolating members aligned and accommodated in the first housing of the first connector portion, further fixed to other side of the first connecting terminals, respectively; and a connecting member for pressing the adjacent isolating member, to thereby collectively fix the first connecting terminals and the second connecting terminals at the contacts therebetween, for electrical connections between the first connecting terminals and the second connecting terminals, respectively.

In the connector, each of the isolating members may be substantially rectangular parallelepiped and chamfered at each of its corners on a side to which the second connecting terminals are inserted and removed.

In the connector, wherein each of the first isolating members is formed with a protruding portion of its surface fixed to the first connecting terminals to fill a level difference therebetween.

According to a still another feature of the invention, a connector comprises:

a first connector portion comprising a first housing with a plurality of first connecting terminals aligned and accommodated therein;

a second connector portion comprising a second housing with a plurality of second connecting terminals aligned and accommodated therein, when the first connector portion and the second connector portion being mated with each other, one side of the first connecting terminals and one side of the second connecting terminals facing each other to form pairs, respectively, and resulting in a stacked structure of the pairs of the first connecting terminals and the second connecting terminals alternately interleaved;

a plurality of first isolating members aligned and accommodated in the first housing, and fixed to other side of the first connecting terminals, respectively;

a second isolating member provided to be fixed to an inner surface of the first housing, and to face other side of the second connecting terminal positioned at an outermost side when stacking the first connecting terminals and the second connecting terminals; and a connecting member comprising a head and a shaft connected to the head, the shaft penetrating each contact between the first connecting terminals and the second connecting terminals and the isolating members, the head pressing the adjacent isolating member, to thereby collectively fix the first connecting terminals and the second connecting terminals at the contacts therebetween, for electrical connections between the first connecting terminals and the second connecting terminals, respectively, at least a portion of the connecting member, which penetrates each contact, being formed of an insulating material.

In the connector, the second isolating member and the first housing may be integrally molded by an insulative resin.

In the connector, each of the first isolating members and the second isolating member may be substantially rectangular parallelepiped and chamfered at each of its corners on a side to which the second connecting terminals are inserted and removed.

In the connector, each of the first isolating members and the second isolating member may be formed with a protruding portion of its surface fixed to the first connecting terminals to fill a level difference therebetween.

In the connector, a flexible cable may be connected to one end of each of the second connecting terminals and the second connector portion may be provided with a cable holding member that allows the second connecting terminals to be held with flexibility at specified positions respectively by holding the cable.

ADVANTAGES OF THE INVENTION

According to the invention, it is possible to provide a connector with a stacked structure, in which a plurality of first connecting terminals, a plurality of second connecting terminals and a plurality of isolating members are alternately interleaved, for realizing further downsizing compared with a conventional device, without reducing the insertability/removability of the connecting terminal even though the holding jig is not additionally provided so as to keep the interval between the isolating members.

BRIEF DESCRIPTION OF THE DRAWINGS

The preferred embodiments according to the invention will be explained below referring to the drawings, wherein:

FIGS. 5A and 5B are explanatory diagrams showing a first connecting terminal, wherein FIG. 5A is a side view thereof and FIG. 5B is a bottom view thereof;

FIGS. 7A and 7B are explanatory diagrams showing a second connecting terminal, wherein FIG. 7A is a side view thereof and FIG. 7B is a bottom view thereof;

FIGS. 8A and 8B are explanatory diagrams showing a second connecting terminal, wherein FIG. 8A is a side view thereof and FIG. 8B is a bottom view thereof; and FIG. 9 is a cross sectional view of a connector in a second embodiment when the first connector portion and the second connector portion are mated.

DETAILED DESCRIPTION OF THE PREFERRED EMBODIMENTS

Next, preferred embodiments according to the present invention will be explained below in more detail in conjunction with appended drawings.

First Embodiment

Firstly, a connector in a first embodiment according to the present invention will be explained below.

Figure 1:
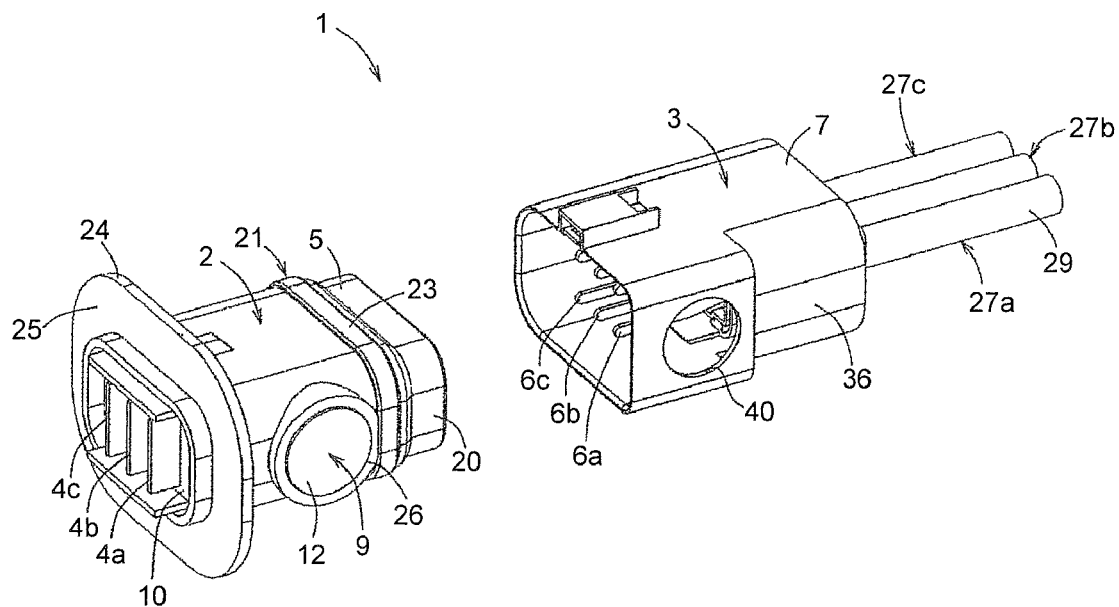
FIG. 1 is a perspective view showing a first connector portion and a second connector portion composing a connector in a first embodiment according to the present invention.
Figure 2:
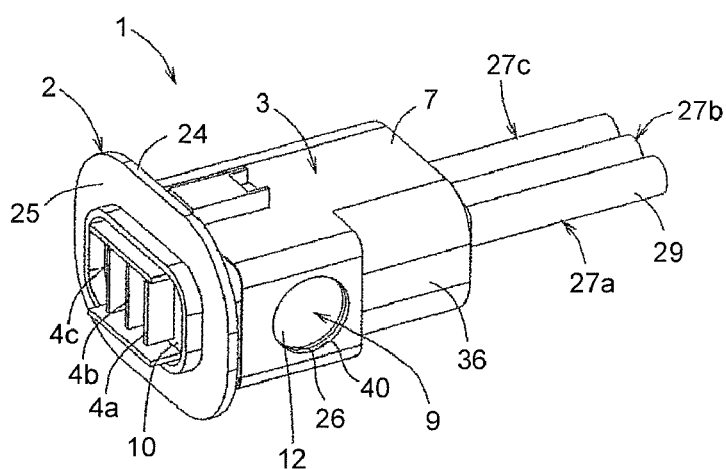
FIG. 2 is a perspective view showing the connector when the first connector portion and the second connector portion are mated.
Figure 3:
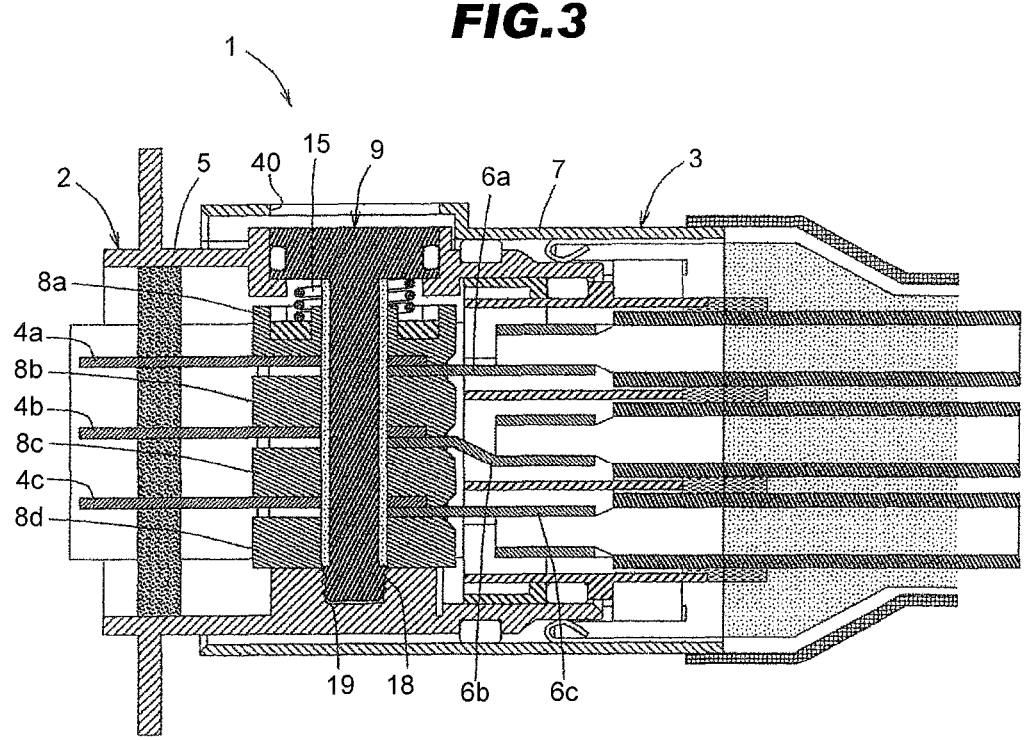
FIG. 3 is a cross sectional view of the connector when the first connector portion and the second connector portion are mated.

FIG. 1 is a perspective view showing a first connector portion 2 and a second connector portion 3 composing a connector 1 in the first embodiment according to the present invention. FIG. 2 is a perspective view showing the connector 1 when the first connector portion 2 and the second connector portion 3 are mated. FIG. 3 is a cross sectional view of the connector 1 when the first connector portion 2 and the second connector portion 3 are mated. In FIGS. 1 and 2, a braided shield 31 and a rubber boot 39 to be described later are omitted. In addition, a recess to which a hexagon wrench (hexagonal spanner) is mated is formed at an upper surface of a head portion 9a of a bolt 12 as a connecting member 9, however, the recess is omitted from FIGS. 1 to 3.

(The Connector 1 Structure)

As shown in FIGS. 1 to 3, the connector 1 in this embodiment comprises a first connector portion 2 and a second connector portion 3 mated with each other, to thereby collectively connect a plurality of power lines.

More specifically, the connector 1 includes the first connector portion 2 having a first housing 5 with a plurality of (three) first connecting terminals (male terminals) 4a to 4c aligned and accommodated therein, and the second connector portion 3 having a second housing 7 with a plurality of (three) second connecting terminals (female terminals) 6a to 6c aligned and accommodated therein. When the first housing 5 of the first connector portion 2 and the second housing 7 of the second connector portion 3 are mated with each other, the first connecting terminals 4a to 4c and the second connecting terminals 6a to 6c face each other to form pairs, respectively, and result in a stacked structure of the pairs of the first connecting terminals 4a to 4c and the second connecting terminals 6a to 6c alternately interleaved.

This connector 1 is used for connection of a vehicle drive motor and an inverter for diving that motor, for example.

More specifically, the first housing 5 of the first connector portion 2 (in FIG. 1, left side portion) is mated with a shield case of the motor, and the first connecting terminal 4a to 4c portions exposed from the first housing 5 are connected to terminals, respectively, of a terminal block installed in the shield case of the motor. Mating to this first connector portion 2 the second connector portion 3 electrically connected with the inverter results in electrical connection of the motor and the inverter. Although the foregoing is concerned with the motor side connection, the same applies to the inverter side connection.

(First and Second Connector Portions 2 and 3)

Below are described the respective specific structures of the first connector portion 2 and the second connector portion 3.

(First Connector Portion 2)

Figure 4:
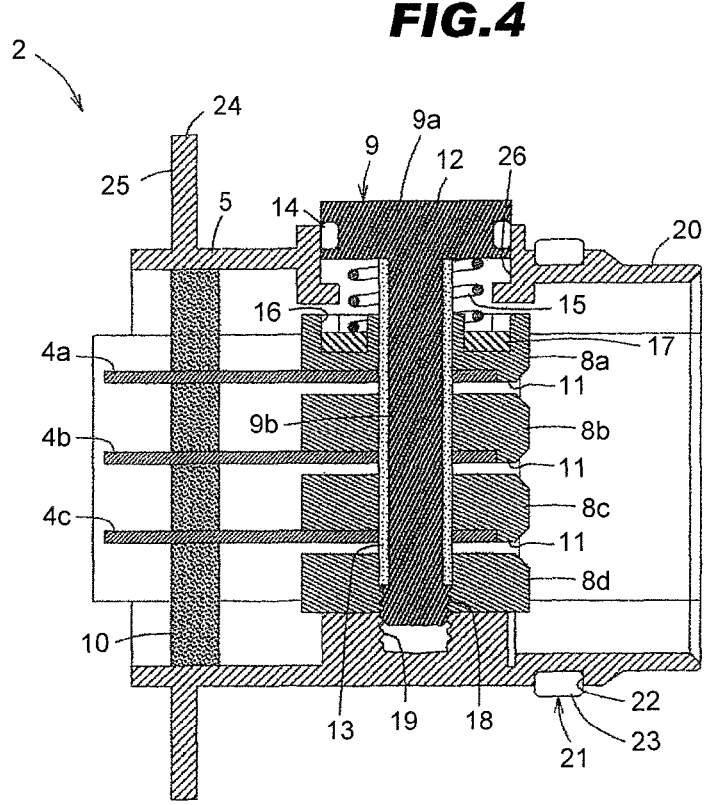
FIG. 4 is a cross sectional view of the first connector portion.

Referring to FIG. 4, the first connector portion 2 has the three first connecting terminals 4a to 4c held therein to be aligned at a specified pitch, and includes the first housing 5 for accommodating the three aligned first connecting terminals 4a to 4c, substantially rectangular parallelepiped isolating members 8a to 8d provided in the first housing 5 for isolating each of the first connecting terminals 4a to 4c, and a connecting member 9 with a head 9a and a shaft 9b connected to the head 9a, whose shaft 9b penetrates each contact between the first connecting terminals 4a to 4c and the second connecting terminals 6a to 6c and the isolating members 8a to 8d, and whose head 9a is pressed against the adjacent isolating member 8a, to thereby collectively fix the first connecting terminals 4a to 4c and the second connecting terminals 6a to 6c at the contacts therebetween, for electrical connections between the first connecting terminals 4a to 4c and the second connecting terminals 6a to 6c, respectively. At least a portion of the connecting member 9, which penetrates each contact, is formed of an insulating material.

The first housing 5 may be a male housing (male side housing) or a female housing (female side housing). Herein, the case that the first housing 5 is the male side housing is explained as an example.

(First Connecting Terminals 4a to 4c)

The first connecting terminals 4a to 4c are plate terminals, and are held to be aligned at a specified pitch by being spaced apart from each other by a molded resin material 10 formed of an insulating resin (e.g. PPS (polyphenylene sulfide) resin, PPA (polyphthalamide) resin, PA (polyamide) resin, PBT (polybutylene terephthalate), epoxy based resin), which forms a portion of the first housing 5. As a method for holding the first connecting terminals 4a to 4c with the molded resin material 10, there is a holding method by inserting the first connecting terminals 4a to 4c during molding of the molded resin material 10 and then curing the resin, or a holding method by pressing the first connecting terminals 4a to 4c into the molded resin material 10 which has been molded beforehand.

The first connecting terminals 4a to 4c are supplied with electricity at different voltages and/or currents, respectively. For example, in this embodiment, power lines are assumed to be for three phase alternating current between a motor and an inverter, so that the first connecting terminals 4a to 4c are supplied with alternating currents, respectively, which are 120 degrees out of phase with each other. For the purpose of reducing the loss of power transmitted through the connector 1, the first connecting terminals 4a to 4c may each be formed of a metal such as a high conductivity silver, copper, aluminum, or the like. Also, the first connecting terminals 4a to 4c each have slight flexibility.

(Isolating Members 8a to 8d)

The isolating members 8a to 8d comprise the plurality of first isolating members 8a to 8c aligned and accommodated in the first housing 5, and integrally fixed to one side of the first connecting terminals 4a to 4c, respectively, (i.e. to the opposite side to the side joined with the second connecting terminals 6a to 6c), and the second isolating member 8d provided to be integrally fixed to an inner surface of the first housing 5, and to face one side of the second connecting terminal 6c (i.e. the opposite side to the side joined with the first connecting terminal 4c) positioned at the outermost side when stacking the first connecting terminals 4a to 4c and the second connecting terminals 6a to 6c.

Figure 5A:
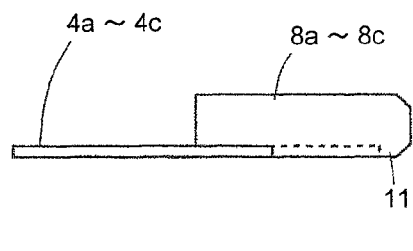
Figure 5B:
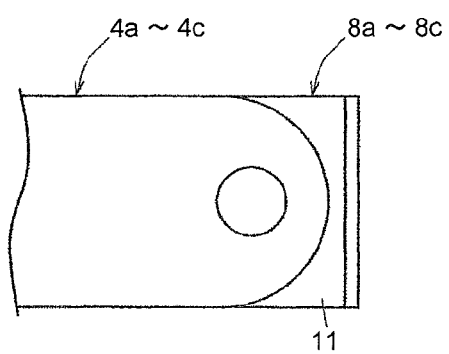

The isolating members 8a to 8d are fixed at such a position as to protrude from the tips of the first connecting terminals 4a to 4c. Each of these isolating members 8a to 8d is chamfered at each of its corners on the second connecting terminal 6a to 6c inserting/removing side. Also, referring to FIGS. 5A and 5B, each of the first isolating members 8a to 8c is formed with a protruding portion (thickened surface) 11 of its surface fixed to the first connecting terminals 4a to 4c to fill the level difference therebetween, so that the lower surfaces (in the figure, the lower sides) of the first isolating members 8a to 8c are coplanar with the lower surfaces (in the figure, the lower sides) of the first connecting terminals 4a to 4c, respectively. With this configuration, when the first connector portion 2 and the second connector portion 3 are mated with each other, the tips of the first connecting terminals 4a to 4c do not contact the inserted tips of the second connecting terminal 6a to 6c. The insertability of the second connecting terminal 6a to 6c is therefore enhanced. In FIG. 5A, the structure of the first isolating member 8a is depicted as being simplified, and the first isolating members 8a to 8c are depicted likewise.

(Connecting Member 9)

Referring again to FIG. 4, the connecting member 9 comprises a bolt (cap bolt) 12 made of a metal (e.g. SUS, iron, copper alloy, or the like) and an insulating layer 13 formed of an insulating resin material (e.g. PPS (polyphenylene sulfide) resin, PPA (polyphthalamide) resin, PA (polyamide) resin, PBT (polybutylene terephthalate), epoxy based resin), which coats a perimeter of the shaft 9b (including the portion penetrating each contact) of that bolt 12.

The entire connecting member 9 formed of an insulating resin may be used, but the connecting member 9 coated with the insulating layer 13 around the perimeter of the shaft 9b of the metallic bolt 12 is preferable from the point of view of strength. That is, the connecting member 9 having a combined structure of the metallic bolt 12 and the insulating layer 13 made of an insulating resin can have enhanced strength, compared to the entire connecting member 9 formed of an insulating resin. As the insulating resin for coating the metallic bolt 12, it is preferred to use an insulating resin, which has a linear expansion coefficient approximate to a linear expansion coefficient of a metal forming the bolt 12, so as to prevent creep.

The head 9a of the connecting member 9 is provided with a packing 14 therearound for preventing water from penetrating into the first housing 5. Also, between the lower surface of the head 9a of the connecting member 9 and the upper surface of the first isolating member 8a directly therebelow is provided an elastic member 15 for applying a specified pressing force to the first isolating member 8a. The elastic member 15 is a spring made of a metal (e.g. SUS, or the like). In this embodiment, the elastic member 15 constitutes a portion of the connecting member 9.

The first isolating member 8a to be in contact with a lower portion of the elastic member 15 is formed with a recessed portion 16 in its upper surface which covers (accommodates) the lower portion of the elastic member 15. At the bottom of the recessed portion 16 (i.e. the base to be in contact with the lower portion of the elastic member 15) is provided a receiving member 17 made of a metal (e.g. SUS, or the like) which receives the elastic member 15 and which is for preventing damage to the first isolating member 8a formed of an insulating resin.

This connecting member 9 is inserted into the first housing 5 from above the first connecting terminal 4a to 4c surfaces (in FIG. 4, the upper surfaces) to which are fixed the first isolating members 8a to 8c, respectively. A screwing portion 18 at a tip of the shaft 9b is then screwed into a screw hole 19 formed in an inner surface of the first housing 5, to thereby allow the connecting member 9 to press the first connecting terminals 4a to 4c and the second connecting terminals 6a to 6c from its head 9a toward the tip of its shaft 9b (in FIG. 4, downward from above), and collectively fix the first connecting terminals 4a to 4c and the second connecting terminals 6a to 6c at the contacts therebetween, for electrical connections between the first connecting terminals 4a to 4c and the second connecting terminals 6a to 6c, respectively.

(First Housing 5)

The first housing 5 is formed of a cylindrical hollow body 20 which is substantially rectangular in transverse cross section. An outer portion at one end (in the figure, at the right end) of the cylindrical body 20 mated with the second housing 7 is formed in a tapered shape, taking the mateability with the second connector portion 3 into consideration. Also, in the outer portion at one end of the cylindrical body 20 is provided a terminal housing waterproofing structure 21 for sealing between the first connector portion 2 and the second connector portion 3. The terminal housing waterproofing structure 21 is formed of a recessed portion 22 formed in an outer portion at the open end of the cylindrical body 20, and a packing 23 provided in the recessed portion 22, such as an O-ring.

In the other end (in the figure, in the left end) of the cylindrical body 20 is accommodated a molded resin material 10 with the first connecting terminals 4a to 4c aligned and held therewith. In an outer portion at the other end of the cylindrical body 20 is formed a flange 24 (an attachment hole omitted) for fixing the first connector portion 2 to a device casing (e.g. a motor shield case). At a rim 25 of the flange 24 having the attachment hole for bolt insertion and fixation to a device casing may be provided a packing for sealing between the first connector portion 2 and the device casing. The structure of this flange 24 is not assumed as fixing the first connector portion 2 to a device casing, but the flange 24 may be provided in the second connector portion 3, or in both the first connector portion 2 and the second connector portion 3. Also, both of the first connector portion 2 and the second connector portion 3 may be free or not fixed to a device casing.

Also, this flange 24 is effective in enhancing the dissipation of heat. That is, the formation of the flange 24 permits a large surface area of the first housing 5, thereby allowing enhancement in the dissipation to outside via the first housing 5, of heat produced inside the first connector portion 2 (e.g. heat produced at each contact).

In an upper portion (in the figure, in the upper side) of the cylindrical body 20 is formed a connecting member insertion hole 26 for inserting the connecting member 9. The connecting member insertion hole 26 is formed in a cylindrical shape, and bent inward at a lower end (in the figure, at the lower side) of that cylindrical shape. A rim of the lower surface of the head 9a of the connecting member 9 is contacted with this bent portion of the connecting member insertion hole 26, to thereby regulate the stroke of the connecting member 9.

For shielding performance, heat dissipation, and weight reduction of the connector 1, the cylindrical body 20 is formed of, preferably a high electrical conductivity, high thermal conductivity and lightweight metal such as an aluminum, but may be formed of a resin, or the like. In the case that the first housing 5 is formed of an insulating resin, the second isolating member 8d and the first housing 5 may integrally be formed of the insulating resin. The cylindrical body 20 formed of an aluminum as mentioned above allows the connecting member 9 to be firmly tightened into the screw hole 19 when screwed thereinto, compared with the cylindrical body 20 formed of an insulating resin.

(Second Connector Portion 3)

Figure 6:
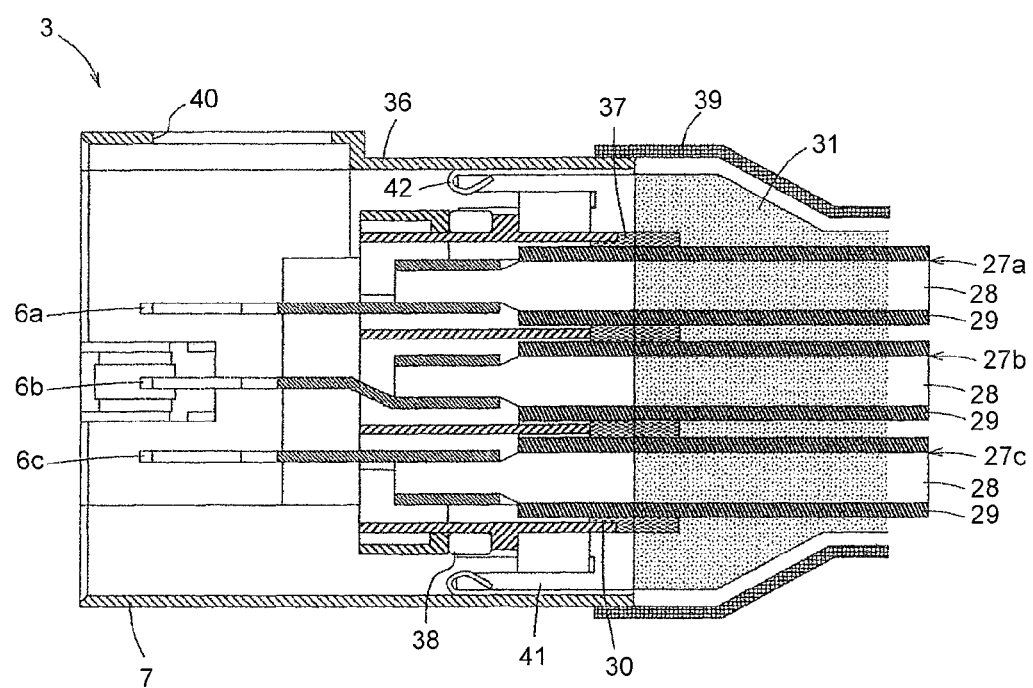
FIG. 6 is a cross sectional view showing the second connector portion.

Referring to FIG. 6, the second connector portion 3 has the second housing 7 with a plurality of (three) second connecting terminals (female terminals) 6a to 6c aligned and accommodated therein. Herein, a connector portion on the female terminal side is called as "second connector portion 3". The second housing 7 may be a male housing (male side housing) or a female housing (female side housing). Herein, the case that the second housing 7 is the female side housing is explained as an example.

The second connecting terminals 6a to 6c are connected with cables 27a to 27c, respectively, at one end, which extend from an inverter. These cables 27a to 27c are electrically connected to the first connecting terminals 4a to 4c via the second connecting terminals 6a to 6c, respectively, and therefore supplied with electricity at voltages and/or currents in correspondence to the second connecting terminals 6a to 6c, respectively. The cables 27a to 27c are constructed by forming an insulating layer 29 around a conductor 28. In this embodiment, the conductor 28 used has a cross section of 20 mm$^2$.

The cables 27a to 27c are held to be aligned at a specified pitch by a multi-cylindrical (i.e. plurality of cylinders are aligned) cable holding member 30. With this cable holding member 30, when the first connector portion 2 and the second connector portion 3 are mated with each other, the second connecting terminals 6a to 6c are held to be positioned below the first connecting terminals 4a to 4c to face (i.e. to be connected to) the second connecting terminals 6a to 6c to form pairs respectively.

The cable holding member 30 is formed of an insulating resin, to isolate the second connecting terminals 6a to 6c from each other to prevent a short circuit. This cable holding member 30 allows the second connecting terminals 6a to 6c to be held at specified positions respectively, even when the cables 27a to 27c respectively connected to the second connecting terminals 6a to 6c have excellent flexibility. That is, in this embodiment, the cables 27a to 27c to be used can have excellent flexibility, and therefore enhance a degree of freedom of wiring the cables 27a to 27c.

Although the second connecting terminals 6a to 6c are positioned by the cable holding member 30 holding the cables 27a to 27c, more specifically, the ends near the second connecting terminals 6a to 6c of the cables 27a to 27c to hold the second connecting terminals 6a to 6c at specified positions respectively, the second connecting terminals 6a to 6c may be positioned by the cable holding member 30 holding the cables 27a to 27c, and the second connecting terminals 6a to 6c directly. Also, a connecting terminal holding member may, in place of the cable holding member 30, be used that holds not the cables 27a to 27c, but the second connecting terminals 6a to 6c directly.

In the case that, with the cable holding member 30, the second connecting terminals 6a to 6c are positioned by holding the cables 27a to 27c without directly holding the second connecting terminals 6a to 6c, that is, in the case of this embodiment, making the cables 27a to 27c flexible allows the tips of the second connecting terminals 6a to 6c to have flexibility relative to the second housing 7. This construction permits flexible adaptation, even to deformation of first connecting terminal 4a to 4c portions to insert the second connecting terminals 6a to 6c in the first connector portion 2, when pressed by the connecting member 9.

Also, a braided shield 31 is wrapped around cables 27a to 27c portions drawn out of the second housing 7, for the purpose of enhancement in shielding performance. This braided shield 31 is contacted with a later-described cylindrical shield body 41, and electrically connected to the first housing 5 (to be equipotential (GND)) through the cylindrical shield body 41.

(Second Connecting Terminals 6a to 6c)

Figure 7A:
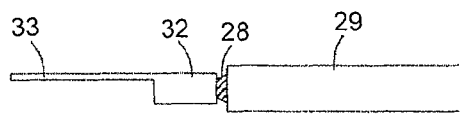
Figure 7B:
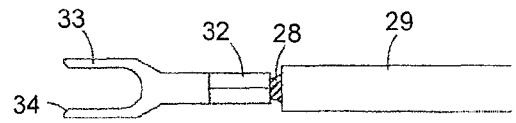

Referring to FIGS. 7 and 8, the second connecting terminals 6a to 6c respectively include calking portions 32 for calking the conductors 28 exposed from the tips of the cables 27a to 27c, and U-shaped contacts 33 formed integrally with the calking portions 32. At tips of the U-shaped contacts 33 are respectively formed tapered portions 34 to enhance the insertability of the U-shaped contacts 33. When the first connector portion 2 and the second connector portion 3 are mated with each other, the U-shaped contacts 33 are inserted in such a manner as to grip the shaft 9b of the connecting member 9.

In this embodiment, to reduce the size of the connector 1, the cables 27a to 27c are configured to be aligned and held as close to each other as possible. To this end, as shown in FIG. 7, a trunk 35 of the second connecting terminal 6b to be connected to the cable 27b arranged in the middle when aligned is bent, to thereby space the second connecting terminals 6a to 6c apart at the same pitch.

The second connecting terminals 6a to 6c may each be constructed of a high electrical conductivity metal such as silver, copper, aluminum, or the like, in order to reduce the loss of power transmitted through the connector 1. Also, the second connecting terminals 6a to 6c each have slight flexibility.

(Second Housing 7)

Referring again to FIG. 6, the second housing 7 is formed of a cylindrical hollow body 36 which is substantially rectangular in transverse cross section. To mate the first housing 5 into the second housing 7, an inner portion at one end (in the figure, at the left end) of the cylindrical body 36 mated with the first housing 5 is formed in a tapered shape, taking the mateability with the first housing 5 into consideration.

Alternatively, the first housing 5 and the second housing 7 may be configured such that the second housing 7 is mated into the first housing 5, contrary to the above case. In this case, an inner portion at one end of the cylindrical body 20 composing the first housing 5 may be formed in a tapered shape, an outer portion at one end of the cylindrical body 36 composing the second housing 7 may be formed in a tapered shape, and the housing waterproof structure 21 may be formed around the outer portion at the one end of the cylindrical body 36.

In the other end (in the figure, in the right end) of the cylindrical body 36 is accommodated the cable holding member 30 with the cables 27a to 27c aligned and held therewith. On a cable insertion side of the cable holding member 30 is formed a packingless sealing portion 37, to prevent water from penetrating onto the cables 27a to 27c and into the second housing 7. In an outer portion of the cable holding member 30 is provided a packing 38 to be in contact with an inner surface of the first housing 5. That is, the connector 1 has a double waterproofing structure of the packing 23 of the terminal housing waterproofing structure 21 and the packing 38 provided in the outer portion of the cable holding member 30.

Further, the other end of the cylindrical body 36 from which the cables 27a to 27c are drawn out is covered with a rubber boot 39 for preventing water from penetrating into the cylindrical body 36.

Also, in an upper portion (in the figure, in the upper side) of the cylindrical body 36 is formed a connecting member manipulation hole 40 for manipulating the connecting member 9 provided in the first connector portion 2 when the first connector portion 2 and the second connector portion 3 are mated with each other.

For shielding performance, heat dissipation, and weight reduction of the connector 1, the cylindrical body 36 is formed of, preferably a high electrical conductivity, high thermal conductivity and lightweight metal such as an aluminum, but may be formed of a resin, or the like. In this embodiment, the cylindrical body 36 is formed of an insulating resin. Therefore, to enhance its shielding performance and heat dissipation, the cylindrical shield body 41 made of aluminum is provided on an inner surface at the other end of the cylindrical body 36.

The cylindrical shield body 41 has a contact 42 to be contacted with an outer portion of the first housing 5 made of an aluminum when the first connector portion 2 and the second connector portion 3 are mated with each other. The cylindrical shield body 41 is thermally and electrically connected with the first housing 5 via this contact 42. This enhances the shielding performance and the heat dissipation. In particular, the heat dissipation is likely to be significantly enhanced by positively allowing heat to escape toward the first housing 5 having an excellent heat dissipation property.

(Connection Between the First Connecting Terminals 4a to 4c and the Second Connecting Terminals 6a to 6c)

Next is described the connection between the first connecting terminals 4a to 4c and the second connecting terminals 6a to 6c using the connector 1 in this embodiment.

When the first connector portion 2 and the second connector portion 3 are mated with each other from an unmated state as shown, the second connecting terminals 6a to 6c are inserted between the first connecting terminal 4a with the isolating member 8a and the isolating member 8b, between the first connecting terminal 4b with the isolating member 8b and the isolating member 8c, and between the first connecting terminal 4c with the isolating member 8c and the isolating member 8d, respectively, where the first connecting terminals 4a to 4c and the second connecting terminals 6a to 6c form pairs respectively. With that insertion, the first connecting terminals 4a to 4c and the second connecting terminals 6a to 6c then face each other to form pairs, respectively, and result in a stacked structure in which the pairs of the first connecting terminals 4a to 4c and the second connecting terminals 6a to 6c and the isolating members 8a to 8d are disposed alternately, i.e. the pairs of the first connecting terminals 4a to 4c and the second connecting terminals 6a to 6c are alternately interleaved with the isolating members 8a to 8d.

In this case, inside the first connector portion 2, the isolating members 8a to 8c are respectively fixed to the tips of the first connecting terminals 4a to 4c held to be aligned at a specified pitch. A pitch between the isolating members 8a, 8b and 8c can therefore be held, even without separately providing a holding jig (see JP Patent No. 4037199) for holding the pitch between the isolating members 8a, 8b and 8c. This allows the second connecting terminals 6a to 6c to be easily inserted between the first connecting terminal 4a with the isolating member 8a and the isolating member 8b, between the first connecting terminal 4b with the isolating member 8b and the isolating member 8c, and between the first connecting terminal 4c with the isolating member 8c and the isolating member 8d, respectively, where the first connecting terminals 4a to 4c and the second connecting terminals 6a to 6c form the pairs respectively. That is, the insertability/removability of the second connecting terminals 6a to 6c is unlikely to deteriorate. Also, because of no need to provide a holding jig for holding the pitch between the isolating members 8a, 8b and 8c, a further size reduction can very effectively be achieved, compared to the prior art.

Also, the contact between the first connecting terminal 4a (or 4b) and the second connecting terminal 6a (or 6b) is sandwiched between the first isolating member 8a (or 8b) fixed to the first connecting terminal 4a (or 4b) constituting the contact, and the first isolating member 8b (or 8c) fixed to the first connecting terminal 4b (or 4c) constituting the other contact. Likewise, the contact between the first connecting terminal 4c and the second connecting terminal 6c is sandwiched between the first isolating member 8c fixed to the first connecting terminal 4c constituting the contact, and the second isolating member 8d fixed to the inner surface of the first housing 5.

Referring to FIG. 3, following that, the connecting member 9 is manipulated through the connecting member manipulation hole 40, to screw and tighten the screwing portion 18 of the connecting member 9 into the screw hole 19 of the first housing 5. The connecting member 9 is then rotated and pressed into the bottom of the screw hole 19, and causes the elastic member 15 to, in turn, press the first isolating member 8a, the first isolating member 8b, the first isolating member 8c, and the second isolating member 8d, and sandwich the contacts between the isolating members 8a and 8b, between the isolating members 8b and 8c, and between the isolating members 8c and 8d, respectively, with the contacts isolated from each other. In this case, by being pressed by the isolating members 8c and 8d, the first connecting terminals 4a to 4c and the second connecting terminals 6a to 6c are slightly bent and contacted with each other, respectively, in a wide range. This allows each contact to be firmly contacted and fixed, even in a vibrational environment such as on vehicle.

Also, although in this embodiment, the first connecting terminals 4a to 4c and the second connecting terminals 6a to 6c are in surface contact with each other respectively, the first connecting terminal 4a to 4c contact side surfaces to be contacted with the second connecting terminals 6a to 6c may be formed with protruding portions, and U-shaped contacts 33 of the second connecting terminals 6a to 6c may be configured to be mated onto these protruding portions, respectively. This configuration allows the further stabilization of the coupling force of the first connecting terminals 4a to 4c and the second connecting terminals 6a to 6c, respectively. That is, this configuration is especially effective for vibration perpendicular to the connecting member 9.

Also, although in this embodiment, lengths of branch tips of each U-shaped contact 33 of the second connecting terminals 6a to 6c are the same, one length thereof may be formed to be long to form a J-shaped contact. The J-shaped contact allows the second connector portion 3 to be inserted into the shaft 9b of the connecting member 9 obliquely relative to the cable longitudinal direction.

Although in this embodiment, the screw hole 19 is formed at such a position as to be screwed onto the screwing portion 18 at the tip of the connecting member 9, the screwing portion 18 may be formed in the head 9a of the connecting member 9, and the screw hole 19 may be formed to be screwed onto the screwing portion 18 formed in the head 9a.

Also, although in this embodiment, the screw hole 19 is formed in the first housing 5, only a through hole, not the screw hole 19 may be formed in the first housing 5, and the screw hole 19 may be formed in the second housing 7. Also, the screw hole 19 may be formed both in the first housing 5 and the second housing 7.

Although the connector 1 in this embodiment has been described, one of the features of the connector 1 in this embodiment is that, unlike a later-described connector 100 in a second embodiment, the shaft 9b of the connecting member 9 penetrates each contact between the first connecting terminals 4a to 4c and the second connecting terminals 6a to 6c and the isolating members 8a to 8d. This configuration allows the facilitation of the constant respective positional relationships of between the first connecting terminals 4a to 4c and the second connecting terminals 6a to 6c relative to the connecting member 9 as a center.

Second Embodiment

Next is described a connector 100 in a second embodiment according to the invention, referring to FIG. 9.

(Connector 100 Structure)

As shown in FIG. 9, the connector 100 in this embodiment is different from the previously described connector 1 in the first embodiment in that the connecting member 9 does not penetrate each contact between the first connecting terminals 4a to 4c and the second connecting terminals 6a to 6c and the isolating members 8a to 8d. That is, in this embodiment, the connecting member 9 is consisted of only the head 9a serving as the pressing portion.

In the connector 1 in the first embodiment, the screwing portion 18 formed in the shaft 9b is screwed into the screw hole 19 of the first housing 5 to thereby tighten the connecting member 9 into the first housing 5, whereas in the connector 100 in this embodiment, the connecting member 9 is formed of only the head 9a, and the connector 100 is therefore configured so that a male screwing portion 43 is formed in such a manner as to avoid the packing 14 around the head 9a, while a female screw 44 into which the screwing portion 43 is screwed is cut in an inner portion of the connecting member insertion hole 26 of the first housing 5, to screw the screwing portion 43 into the female screw 44 and thereby tighten the connecting member 9 into the first housing 5.

As shown in FIG. 9, the head 9a is shaped to have a large diameter portion provided with the packing 14 and a small diameter portion formed with the male screwing portion 43, and to shape the connecting member insertion hole 26 to have those two diameter dimensions. With this configuration, when the head 9a is tightened into the connecting member insertion hole 26, the male screwing portion 43 is not disposed in a portion facing the packing 14. This can therefore ensure its effective waterproofing structure.

Also, on a lower surface of the head 9a of the connecting member 9 (on the lower surface facing the first isolating member 8a) is formed an elastic member holding portion 45 for engaging and holding the elastic member 15. The elastic member 15 is held by this elastic member holding portion 45 to form a portion of the connecting member 9.

The connection of the first connecting terminals 4a to 4c and the second connecting terminals 6a to 6c using this connector 100 is performed in the same procedure as that of the previously described connector 1 in the first embodiment. That is, the mating of the first connector portion 2 and the second connector portion 3 is followed by tightening the male screwing portion 43 of the connecting member 9 into the female screw 44 of the first housing 5, concurrently with this, sequentially exerting the pressing force of the elastic member 15 to the isolating members 8a to 8d, and pressing the contacts to be sandwiched between the isolating members 8a and 8b, 8b and 8c, and 8c and 8d, respectively, to thereby connect the first connecting terminals 4a to 4c and the second connecting terminals 6a to 6c, respectively. This allows the first connecting terminals 4a to 4c and the second connecting terminals 6a to 6c to be firmly fixed to each other respectively.

Also, in this embodiment, since the connecting member 9 does not penetrate each contact between the first connecting terminals 4a to 4c and the second connecting terminals 6a to 6c and the isolating members 8a to 8d, there is no need to form the contacts of the second connecting terminals 6a to 6c in such a shape as to avoid the connecting member 9 (e.g. in the previously mentioned U-shape).

Although the connector 100 in the second embodiment has been described, one of the features of the connector 100 in the second embodiment is that, unlike the previously described connector 100 in the first embodiment, the connecting member 9 does not penetrate each contact between the first connecting terminals 4a to 4c and the second connecting terminals 6a to 6c and the isolating members 8a to 8d. This configuration results from fixing the isolating members 8a to 8c to the other surfaces of the first connecting terminals 4a to 4c respectively, and can ensure the cost reduction of the connecting member 9. Also, this leads to the weight reduction of the connecting member 9, thus allowing a contribution to the weight reduction of the entire connector.

The invention is not limited to the above-described embodiments, but various alterations are possible in the scope not departing from the gist of the invention.

Also, although in this embodiment, three phase alternating power lines have been assumed, according to the technical idea of the invention, the connector for a vehicle, for example, may be configured to collectively connect lines for different uses, such as three phase alternating current power lines for between a motor and an inverter, two phase direct current power lines for an air conditioner, and the like. This configuration allows power lines for a plurality of uses to be collectively connected by one connector. There is therefore no need to prepare a different connector for each use, to thereby allow a contribution to space saving or low cost.

Also, although in this embodiment, when viewed from the head 9a of the connecting member 9, the first connecting terminals 4a to 4c and the second connecting terminals 6a to 6c have been configured to be linearly contacted with each other respectively, the first housing 5 and the second housing 7 may be configured so that, when viewed from the head 9a of the connecting member 9, the first connecting terminals 4a to 4c of the first connector portion 2 cross and contact the second connecting terminals 6a to 6c of the second connector portion 3 respectively at a right angle thereto. That is, the first connector portion 2 and the second connector portion 3 may be mated with each other in an L-shape. Likewise, the second housing 7 and the second connecting terminals 6a to 6c may be configured to be disposed obliquely relative to the first housing 5 and the first connecting terminals 4a to 4c respectively. By thus applying the gist of the invention, the direction of inserting/removing the second connector portion 3 relative to the first connector portion 2 may be varied. That is, the direction of drawing the cables out from the connector can be mated to the shape of an installation portion, to thereby allow a contribution to space saving.

Also, the terminal surfaces of the first connecting terminals 4a to 4c and the second connecting terminals 6a to 6c may be knurled to make their frictional force large, so that the terminals are thereby unlikely to move relative to each other, and are firmly fixed at the contacts therebetween respectively.

Also, although in this embodiment it has been described that, unlike the second connecting terminals 6a to 6c, the first connecting terminals 4a to 4c are not connected with cables respectively, the first connecting terminals 4a to 4c are not limited to this structure. The connector 100 in this embodiment may be used for connecting cables to each other.

Also, although in this embodiment, the cables 27a to 27c used have excellent flexibility, rigid cables may be used.

Also, although in this embodiment, the bolt 12 has been described as the example of the connecting member 9, the connecting member 9 configuration is not limited to bolt shape. For example, a shaft of a CPA (Connector Position Assurance) lever which fixes mating between the first connector portion 2 and the second connector portion 3 may be configured as the connecting member 9, in which the CPA lever is rotated to fix the mating and to press (or tighten) the connecting member 9 from the head 9a of the connecting member 9 toward a tip end of the shaft 9b.

Also, in this embodiment, the head 9a of the bolt 12 as the connecting member 9 is formed with a recess in its upper surface (more specifically, at the center of the upper surface), into which a hexagon wrench (hexagonal spanner) is mated. Although in this embodiment, the specified manipulation tool has been assumed as being a commercial hexagon wrench, the head 9a of the bolt 12 as the connecting member 9 may be formed with a recess having a shape corresponding to the specified manipulation tool that is not commercialized, with assuming that the non-commercial specified manipulation tool is used.

Also, in this embodiment, the use orientation of the connector is such that the connecting member 9 may be substantially horizontal or substantially vertical. In other words, the use conditions of the connector in this embodiment require no use orientation.

Also, although in this embodiment, the head 9a of the connecting member 9 is pressed against the adjacent isolating member 8a via the elastic member 15 constituting a portion of the connecting member 9, the head 9a may be pressed directly against the adjacent isolating member 8a, not via the elastic member 15.

Although the invention has been described with respect to the above embodiments, the above embodiments are not intended to limit the appended claims.

Also, it should be noted that not all the combinations of the features described in the above embodiments are essential to the means for solving the problems of the invention.

What is claimed is:

1. A connector, comprising:
   a first connector portion comprising a first housing with a plurality of first connecting terminals aligned and accommodated therein;
   a second connector portion comprising a second housing with a plurality of second connecting terminals aligned and accommodated therein, when the first connector portion and the second connector portion being mated with each other, one side of the first connecting terminals and one side of the second connecting terminals facing each other to form pairs, respectively, and resulting in a stacked structure of the pairs of the first connecting terminals and the second connecting terminals alternately interleaved;
   a plurality of isolating members aligned and accommodated in the first housing of the first connector portion, further fixed to other side of the first connecting terminals, respectively; and
   a connecting member comprising a head and a shaft connected to the head, the shaft penetrating each contact between the first connecting terminals and the second connecting terminals as well as the isolating members, the head pressing the adjacent isolating member, to thereby collectively fix the first connecting terminals and the second connecting terminals at the contacts therebetween, for electrical connections between the first connecting terminals and the second connecting terminals, respectively, at least a portion of the connecting member, which penetrates each contact, being formed of an insulating material.

2. The connector according to claim 1, wherein each of the isolating members is substantially rectangular parallelepiped and chamfered at each of its corners on a side to which the second connecting terminals are inserted and removed.

3. The connector according to claim 1, wherein a flexible cable is connected to one end of each of the second connecting terminals and the second connector portion is provided with a cable holding member that allows the second connecting terminals to be held with flexibility at specified positions respectively by holding the cable.

4. The connector according to claim 2, wherein a flexible cable is connected to one end of each of the second connecting terminals and the second connector portion is provided with a cable holding member that allows the second connecting terminals to be held with flexibility at specified positions respectively by holding the cable.

5. A connector, comprising:
   a first connector portion comprising a first housing with a plurality of first connecting terminals aligned and accommodated therein;
   a second connector portion comprising a second housing with a plurality of second connecting terminals aligned and accommodated therein, when the first connector portion and the second connector portion being mated with each other, one side of the first connecting terminals and one side of the second connecting terminals facing each other to form pairs, respectively, and resulting in a stacked structure of the pairs of the first connecting terminals and the second connecting terminals alternately interleaved;
   a plurality of isolating members aligned and accommodated in the first housing of the first connector portion, further fixed to other side of the first connecting terminals, respectively; and
   a connecting member for pressing the adjacent isolating member, to thereby collectively fix the first connecting terminals and the second connecting terminals at the contacts therebetween, for electrical connections between the first connecting terminals and the second connecting terminals, respectively.

6. The connector according to claim 5, wherein each of the first isolating members is formed with a protruding portion of its surface fixed to the first connecting terminals to fill a level difference therebetween.

7. The connector according to claim 6, wherein the second isolating member and the first housing are integrally molded by an insulative resin.

8. The connector according to claim 6, wherein each of the first isolating members and the second isolating member is substantially rectangular parallelepiped and chamfered at each of its corners on a side to which the second connecting terminals are inserted and removed.

9. The connector according to claim 7, wherein each of the first isolating members and the second isolating member is formed with a protruding portion of its surface fixed to the first connecting terminals to fill a level difference therebetween.

10. The connector according to claim 5, wherein a flexible cable is connected to one end of each of the second connecting terminals and the second connector portion is provided with a cable holding member that allows the second connecting terminals to be held with flexibility at specified positions respectively by holding the cable.

11. The connector according to claim 6, wherein a flexible cable is connected to one end of each of the second connecting terminals and the second connector portion is provided with a cable holding member that allows the second connecting terminals to be held with flexibility at specified positions respectively by holding the cable.

12. The connector according to claim 7, wherein a flexible cable is connected to one end of each of the second connecting terminals and the second connector portion is provided with a cable holding member that allows the second connecting terminals to be held with flexibility at specified positions respectively by holding the cable.

13. The connector according to claim 8, wherein a flexible cable is connected to one end of each of the second connecting terminals and the second connector portion is provided with a cable holding member that allows the second connecting terminals to be held with flexibility at specified positions respectively by holding the cable.

14. The connector according to claim 9, wherein a flexible cable is connected to one end of each of the second connecting terminals and the second connector portion is provided with a cable holding member that allows the second connecting terminals to be held with flexibility at specified positions respectively by holding the cable.

15. A connector, comprising:
   a first connector portion comprising a first housing with a plurality of first connecting terminals aligned and accommodated therein;
   a second connector portion comprising a second housing with a plurality of second connecting terminals aligned and accommodated therein, when the first connector portion and the second connector portion being mated with each other, one side of the first connecting terminals and one side of the second connecting terminals facing each other to form pairs, respectively, and resulting in a stacked structure of the pairs of the first connecting terminals and the second connecting terminals alternately interleaved;

a plurality of first isolating members aligned and accommodated in the first housing, and fixed to other side of the first connecting terminals, respectively;

a second isolating member provided to be fixed to an inner surface of the first housing, and to face other side of the second connecting terminal positioned at an outermost side when stacking the first connecting terminals and the second connecting terminals; and a connecting member comprising a head and a shaft connected to the head, the shaft penetrating each contact between the first connecting terminals and the second connecting terminals and the isolating members, the head pressing the adjacent isolating member, to thereby collectively fix the first connecting terminals and the second connecting terminals at the contacts therebetween, for electrical connections between the first connecting terminals and the second connecting terminals, respectively, at least a portion of the connecting member, which penetrates each contact, being formed of an insulating material.

16. The connector according to claim 15, wherein each of the first isolating members and the second isolating member is substantially rectangular parallelepiped and chamfered at each of its corners on a side to which the second connecting terminals are inserted and removed.

17. The connector according to claim 15, wherein a flexible cable is connected to one end of each of the second connecting terminals and the second connector portion is provided with a cable holding member that allows the second connecting terminals to be held with flexibility at specified positions respectively by holding the cable.

18. The connector according to claim 16, wherein a flexible cable is connected to one end of each of the second connecting terminals and the second connector portion is provided with a cable holding member that allows the second connecting terminals to be held with flexibility at specified positions respectively by holding the cable.

* * * * *